(12) United States Patent
Jesberger (10) Patent No.: US 8,327,893 B2
(45) Date of Patent: Dec. 11, 2012

(54) INFEED/OUTFEED ATTACHMENT FOR FACILITATING THE PROCESSING OF SHEET GOODS THROUGH A PROCESSING DEVICE

(76) Inventor: Lee A. Jesberger, Sewell, NJ (US)

( * ) Notice: Subject to any disclaimer, the term of this patent is extended or adjusted under 35 U.S.C. 154(b) by 143 days.

(21) Appl. No.: 12/202,376

(22) Filed: Sep. 1, 2008

(65) Prior Publication Data

US 2010/0050840 A1    Mar. 4, 2010

(51) Int. Cl.
   *B25H 1/00* (2006.01)
(52) U.S. Cl. .................... 144/286.1; 144/286.5; 83/469; 83/472
(58) Field of Classification Search ....... 144/286.1–287; 83/469, 471, 472, 474; 108/59, 64
   See application file for complete search history.

(56) References Cited

U.S. PATENT DOCUMENTS

| | | | | |
|---|---|---|---|---|
| 2,297,647 A * | 9/1942 | Chason | ............................ | 108/69 |
| 2,555,217 A * | 5/1951 | Young | ............................ | 269/309 |
| 2,722,243 A * | 11/1955 | Nagy | ........................ | 193/35 TE |
| RE24,319 E * | 5/1957 | McLaughlin | ............... | 193/35 R |
| 4,068,551 A * | 1/1978 | Kreitz | .......................... | 83/471.3 |
| 4,106,381 A * | 8/1978 | Kreitz | .......................... | 83/477.2 |
| 4,393,969 A * | 7/1983 | Woell | ........................ | 193/35 TE |
| 5,435,411 A * | 7/1995 | Borgatti | ..................... | 182/181.1 |
| 5,487,445 A * | 1/1996 | Biehl | ........................ | 182/181.1 |
| 6,189,429 B1 * | 2/2001 | Liu | .................................. | 83/477 |
| 6,193,044 B1 * | 2/2001 | Larsen | ........................ | 193/35 R |
| 6,439,280 B1 * | 8/2002 | Wang | ............................ | 144/287 |
| 6,575,213 B1 * | 6/2003 | Houk | ............................ | 144/287 |
| 7,059,370 B2 * | 6/2006 | Wang | ............................ | 144/287 |

* cited by examiner

*Primary Examiner* — Bena Miller
(74) *Attorney, Agent, or Firm* — Michael Ries (57) ABSTRACT

An infeed/outfeed attachment for facilitating the processing of sheet goods through a processing device. The infeed/outfeed attachment may have a support frame, a plurality of coplanar ball rollers, a track, an engagement section in sliding engagement with the track, a cylindrical roller for reducing friction during loading and unloading of the sheet goods, vertically adjustable legs, and a hinge allowing the attachment to fold flat for easy storage. Track may have a groove. The groove and the engagement section may have T-shaped cross-sections. The engagement section having a T-shaped cross-section may have an L-shaped member, a washer, an intermediate member, a threaded bolt and a nut. Also, a method of attaching the infeed/outfeed attachment to the processing device, the processing device often, but not always having a table and a beam attached to the table with a plurality of bolts.

10 Claims, 11 Drawing Sheets

INFEED/OUTFEED ATTACHMENT FOR FACILITATING THE PROCESSING OF SHEET GOODS THROUGH A PROCESSING DEVICE

TECHNICAL FIELD AND BACKGROUND

The present invention generally relates to the field of processing equipment. Specifically, the present invention relates to attachments for facilitating the processing of materials through a processing device. More specifically, the present invention relates to a table attachment for facilitating the processing of sheet goods, such as plywood, through a processing device, such as a table saw or router table.

There are many devices for processing sheet goods. There are approximately 6 million table saws or related machines currently in use in the United States, and approximately 80,000 units are sold each year. More and more table saws are being designed to be smaller and lighter, making them portable, enabling a new home builder or remodeling contractor to make use of them at job sites. These smaller, lighter table saws are prone to being tipped over when cutting large sheet goods, as the foot print of the saw and the physical weight of the saw cannot overcome the advantage of leverage that cutting large panels subject them to. Also, with known processing devices, it is often the case that the devices are not particularly suited for prevention of back injuries to the user or preventing damage to the sheet goods before, during and after processing. It is also often difficult for one person to efficiently and effectively process a material, such as a large sheet of plywood or long piece of lumber, through a processing device, such as a table saw or router table. In some cases, an individual piece of material may weigh nearly 100 pounds. When a particular piece of material is heavy, it is difficult to load and unload the material. Also, it is difficult to accurately position and move the material through the processing device. For large pieces of material, a worker might not be able to see around the material when loading the material onto the processing device. Often, a worker will load the material, without being able to see, by bumping the material into the processing device, resulting in damage to the material or the processing device itself. Also, the awkwardness of the known loading procedure consists of one hand on the bottom edge of the sheet, with the other hand at the top edge of the sheet. While being stretched out in this position, the worker must bend over and lay the sheet onto the work surface. This often leads to back injury. Further, when loading a large piece of material, such as a piece of material that is eight feet long, a single worker will be positioned far away from the cutting point of the processing device. One method for a single worker to process a piece of material is to carry the material to the processing device, lay the sheet material onto the processing device, often with the machine running, creating a very dangerous condition. The worker must then reposition him or her self at the left rear end of the material, being careful not to bring the material into contact with the cutting point of the processing device. The worker must then feed the material while walking forward, both holding the weight of the material, and guiding it through the processing device attempting to cut or shape the material to very close tolerances. Often, this procedure results in the inaccurate processing of the material.

The present invention overcomes the above-referenced problems related to single user operation of processing devices, particularly regarding the processing of sheet goods. This device has proven to enable woodworkers with medical conditions, such as replacement hips and knees, as well as those with arthritis to continue to pursue their vocation. It has also proven to permit elderly or less physically strong individuals to do what they were previously unable to do. With the average median age of hobbyist woodworkers is between 40 and 65 years of age, this process is becoming increasingly more difficult for a growing number of people.

Additionally, with the size of many of the newer saws being designed smaller and more portable, using my table attachment at the front and/or rear of the portable processing device, greatly increases the size of the saw's footprint, reducing or eliminating the potential to tip over while in use.

The present invention is a material handling device. It is a woodworking infeed and outfeed system, intended to allow one person to easily handle and process bulky materials. The advantages to such a device is multi functional, in that it saves wasted materials, due to controlling large, bulky panels is difficult, and poor results are non usable. Additionally, it saves back injury, and strain resulting from trying to handle these bulky materials, which can weigh up to one hundred pounds, and more. The device allows the user to accurately and easily move these heavy sheets to permit exacting control of said materials, as they're fed through the processing machines. Prior to inventing such a device, an exhaustive search was done in an effort to purchase such a device, as my hip and back would no longer permit me to perform my livelihood. After locating and viewing the available options, it became apparent that my choices were to give up my livelihood or design something that would address all the design details that were missing in the available options. Something that would permit easy loading of these heavy materials, could not be knocked over or bumped out of alignment to the processing machine and also provide the means needed to achieve the control necessary to result in the accuracy required in cabinet and furniture making. Additionally, it would need to hold the cut parts so as to permit shutting of the machine and removing the parts without risk of them falling on the floor, resulting in damaged parts.

McLaughlin (RE24,319) discloses a feed attachment comprising a means for support, means for horizontal support and movement (FIG. 1) and a means for horizontal movement of the feed attachment with respect to a processing device (FIG. 1), the means for horizontal support and movement comprises a plurality of ball rollers (18), wherein the plurality of ball rollers are coplanar and means for vertical adjustment. (FIG. 1)

The device, as invented by McLaughlin (RE 24,319), differs in function, design, and purpose. The referenced invention is a gravity fed conveyor system, designed to permit movement of goods from one location to another. The ball rollers as shown, (FIG. 1) are actually wheels mounted to an axel, and a series of multi directional wheels located at the front end.

This conveyor is not affixed to a processing device, with the intended purpose of machining the goods being moved. It is simply a gravity method of transporting goods. Additionally, the unit as described is made up with the potential of an extendable telescoping design, allowing for various lengths of goods movement.

The adjustable legs are accomplished by means of telescoping legs, located at the front and rear of the conveyor. It does not ride on a track, controlling the perpendicular movement of the device, in relation to a processing machine, designed to process, cut, shape, or otherwise alter raw sheet goods, as required in, but not limited to a woodworking shop. It is also not dependent on a rip fence rail, as found on the processing machines used in the trades, controlling the lateral movement in a precision fashion.

Houk (U.S. Pat. No. 6,575,213) discloses a feed attachment comprising a means for support, means for horizontal support and movement (FIG. 1), and a means for horizontal movement of the feed attachment with respect to a processing device (FIG. 1), the means for horizontal support and movement comprises a plurality of ball rollers (30), wherein the plurality of ball rollers are coplanar and means for vertical adjustment (FIGS. 3, 4). Houk discloses means for reducing friction (18; FIG. 4), wherein the means for reducing friction comprises a cylindrical roller.

The invention, as described on the referenced drawings and claims are different in function and design. While the device is designed for the woodworking industry, that is where the similarity ends. While the claims suggest that units corrode or degrade over time, the fact that these machines are located inside a woodworking or similar shop, rain and snow is not usually a problem. Therefore in direct opposition to the claims made by Houk. Metal is a strong and dependable material, used world wide for both interior and exterior purposes. The invention as designed by Houk, is very similar in design to that of a standard roller stand, and includes the major shortcomings of that design. It is the experience of countless woodworkers that these devices tip over while trying to load sheet goods onto them. It is a design flaw and results in replacing one problem with another. The frustration in trying to use these devices as intended is the very situation that lead to creating my invention. My unit cannot be knocked over, or bumped out of alignment to the processing device. As a professional woodworker, the need for such a device was apparent, as all known inventions only result in replacing one problem with another. Another problem with this design is the worker must still risk back injury in loading the materials, still follow the same basic procedures required without using such a device, in that the worker must still be positioned far from the processing point, must still walk forward while trying to maintain directional control, and also be ready for when the material drops off stand, as designed by Houk.

As a free standing unit, the potential to be knocked over, while attempting to load a ninety pound sheet of material onto it, while not being able to see the device is difficult at best. The problem of handling the bulky, heavy material is not addressed in any fashion. The very nature of this invention can lead to severe back strains and injuries due to holding a four foot wide sheet, and bending over to place it on the stand. This activity is the major cause of back problems in the woodshop.

Our invention affixes the device to the processing machine, while providing a means to load heavy sheet goods, without the need to lift the entire weight of the sheet, and walk over to a stand, which you can't see. The fact that our device is attached to the processing machine means it is automatically aligned to the machine. It cannot be knocked over, or out of alignment to the cutting blade, causing a potentially dangerous condition, known as kick back, wherein the sheet is bound by the cutting blade, and thrown back at you with enough force to be fatal. Also, with our design, only one person is required to load the sheet goods onto the device.

Our invention allows the user to be actually touching the processing machine, during the entire cutting process, which results in being able to see the cutting blade and fence you are guiding the sheet against, resulting in a far more accurate capability. Our invention will allow the user to leave the sheet unattended, and it will not fall from the infeed/outfeed device. The user is not carrying any of the weight of the materials being processed, allowing full attention on making an accurate cut.

Biehl (U.S. Pat. No. 5,487,445). discloses a feed attachment comprising a means for support, means for horizontal support and movement (FIG. 1) and a means for horizontal movement of the feed attachment with respect to a processing device (FIG. 1), the means for horizontal support and movement comprises a plurality of ball rollers (FIG. 4), wherein the plurality of ball rollers are coplanar and means for vertical adjustment (22, 23; FIG. 1).

With regard to claims 4 and 5 as best as can be understood, Biehl discloses a track and an engagement section including engagement with the track (14; FIGS. 2, 6) the track comprises a groove (14) wherein the grove has a T-shaped cross section (FIG. 2) and a wherein the engagement section (16) has a T-shaped cross-section (FIGS. 2, 6).

Upon reviewing the drawings and claims regarding this invention, we are in no way imposing on either his claims or design. Ours is a two rail system, mounted to a fixed track, which forces alignment perpendicular to the front and or rear of the processing machine. His design is a single rail with transfer balls, and in no way attach to the processing machine. Additionally, his arrangement makes no effort to assist the user to load the materials onto the invention. His invention can be placed anywhere around the saw, and this is actually a safety hazard, in that an inexperienced user can move the work piece in such a fashion as to create a situation known as a kick back. This occurs when the work piece is moved on a different parallel plane than the cutting blade. This causes the blade to bind, and in turn throw the work piece at considerable force. This condition can be fatal.

Our device is forced to be properly aligned to the cutting blade, and with the weight of the work piece fully supported by the device, allows the user to stand to the side of the work piece, and out of harms way, should a kick back occur.

Also, as this is a free standing unit, knocking it over is likely when dealing with a large sheet which is blocking your view of the unit. It also forces the user in an awkward position when trying to place the sheet on the device, which can lead to serious back strain or injury. The track referred to in his description is in no way similar to our track, nor does it serve the same purpose.

Woell U.S. Pat. No. 4,393,969 discloses a feed attachment comprising a means for support, means for horizontal support and movement (FIG. 1) and a means for horizontal movement of the fed attachment with respect to a processing device (FIG. 1), means for vertical adjustment (56; FIG. 1) and means for folding the feed attachment into a flat shape (FIG. 2). The invention as referenced above refers to a unit independent of the power saw. Our unit is completely dependent on the processing device, in that it uses said device to align our invention to the saw or other machines, as well as holding our device in a fixed position, so as not to move when loading the materials onto the device.

Using plastic pipe as the rollers allows the device to actually pull the materials to be cut away from the guiding rip fence, if the invention is slightly out of alignment to the saw, which is probable due to the fact it is not attached to the processing machine. It will alter the direction of feed away from parallel to the cutting blade, if it is bumped out of alignment to the processing device, again allowing the potential of kick back.

Additionally, the adjustable legs in the front and rear of the device result in less convenient multi machine use. It also offers no means of helping load the sheet goods onto the device.

My invention requires an initial installation to the major machine, typically a table saw. Once installed on the machine, it is adjusted to the height of the saw. With the locking nuts, these adjustments are permanent. This establishes a shop standard regarding height. For multiple machine use, the additional machines will have the track installed to the height on our invention. This results in a unit that can be move to different machines, without any adjustment, in a matter of seconds.

Yang (U.S. Pat. No. 6,439,280) discloses a method of attaching to a feed attachment to a processing device, the feed attachment comprising means for support, means for horizontal support and movement (40; FIG. 1) and a means for horizontal movement of the fed attachment with respect to a processing device (FIG. 1), means for vertical adjustment (56; FIG. 1) processing device comprising a table and a beam, the method comprising removing bolts (23); attaching support bracket to the beam using the bolts; attaching the means for horizontal movement to the processing device (FIG. 2-5); and attaching the device to the processing device (FIG. 1). Yang discloses a track and engagement section having a T-shaped cross section (FIGS. 3,4).

The invention referenced above is not like mine in form, function, or purpose. The idea behind this invention is merely to provide a support for work pieces. It is not an infeed and or outfeed system, in that it provides no assistance in easing or reducing friction involved in material moving. It is affixed to the processing machine in a non removable fashion. It is also attached to the side and rear of the saw, whereas my invention is easily attached and removed from the processing device in seconds, at both the front and rear. It has multi machine use, and is designed specifically for loading and handling sheet good. It is also multi positional by means of a track and precision mounting brackets, which slide to the desired position. The device can be quickly removed from the processing machine and folded to be stored easily.

Wang's device is limited is length and will not support a full length sheet without falling off the rear of the saw. Our device will permit the full sheet to be supported, before, during and after the after the cut.

Borgitti (U.S. Pat. No. 5,435,411) discloses a method of providing a material handling stand, with long work pieces in mind. It consists in a freestanding tripod metal base, a metal telescoping pole, which is height adjustable, atop which sits a double purpose swivel head. One side being a cylindrical roller, the flip side being ball rollers. It is apparent that this device is not intended to be used for sheet goods as it too has no means to physically attach it to a processing device, preventing tipping over upon loading the sheet materials on too it. It also provides no means of assisting the worker of loading sheet goods onto it. Attempting to use this unit for sheet materials can lead to the same back injuries as the units previously referenced.

Larson (U.S. Pat. No. 6,193,044) discloses a pivotal roller conveyer that permits the conveyor section to be turned to either side for loading and offloading. It does not fasten to any sort of processing machine, and in no way is similar to my invention regarding function, purpose or design.

BRIEF DESCRIPTION OF THE SEVERAL VIEWS OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however, the order of description should not be construed as to imply that these operations are necessarily order dependent. In particular, these operations need not be performed in the order of presentation. The phrase in one embodiment is used repeatedly. The phrase generally does not refer to the same embodiment, however, it may. The terms comprising, having and including are synonymous, unless the context dictates otherwise.

The present invention is directed to a removable, portable metal infeed/outfeed extension table attachment designed for, but not limited to woodworking machinery. Infeed/outfeed is defined also as just the term feed. So when the term feed is used it could mean infeed only or out feed only or any combination of infeed outfeed. The table attachment is particularly well suited for use and operation by one operator, but may, of course, be used by multiple workers. The table attachment allows one person to load sheet goods, for example, plywood, solid surface goods and the like, onto a processing device. With the use of a cylindrical roller, mounted on either or both sides of the main frame, a user is able approach the table attachment perpendicular to the table attachment. It is then a matter of lifting only one end of the sheet, effectively reducing the weight of the sheet by approximately fifty percent. Once the end of the material is placed onto this cylindrical roller, it becomes a mater of rolling the sheet onto the attachment table, and laying it flat. At this point, the table attachment is holding one hundred percent of the weight. The user can position the sheet as desired, prior to turning on the processing device. The table attachment is particularly well suited for heavy sheet materials weighing as much as 100 pounds and more but any weight sheet material will be easy to move and align with my present invention. The table attachment may be provided in any suitable length or width and may be adapted for use with any type of processing device. The table attachment may be constructed of metal tube framework and may be welded or bolted together. As described in greater detail below, the table attachment may be attached perpendicularly to the existing front and/or rear of a processing device. The table attachment may have a frame with folding metal legs for support. The frame may have a series of cross members attached perpendicularly to the frame, onto which may be mounted a series of ball rollers or transfer ball glides. The ball rollers may be provided flush or coplanar with the work surface thus enabling large or awkward work pieces to be safely and accurately guided through the cutting or machining process. The left and/or right sides of the table attachment may have a long cylindrical roller to permit easy loading of sheet goods onto and off of the table attachment. This roller is critical to those less physically adept, or in some way disabled. The roller effectively cuts the weight of the material in half, making loading much safer, as the position of the worker is not at risk to back strain. Additionally, the machine need not be running, as it allows for the material to be loaded and positioned prior to turning on the processing machine. The first cross member may be provided far enough from the rail of the processing device so as not to interfere with an existing rip fence commonly found on table saws. Additionally, using the various track and mounting brackets, the table attachment can be adjusted to the height of the main processing device in the wood shop. Once adjusted, this need not be reset. Due to the design of many processing devices which take into account the physical human form, and is often the basis of such design, it is possible to adjust the table attachment to the height of the major processing device, creating a shop standard, and using the various attaching brackets and mounting hardware, mount tracks or brackets in the proper position to permit the same settings on the table for many of wood shops processing devices, with no adjustments required. This permits movement of the table attachment from various processing devices in seconds.

Figure 1:
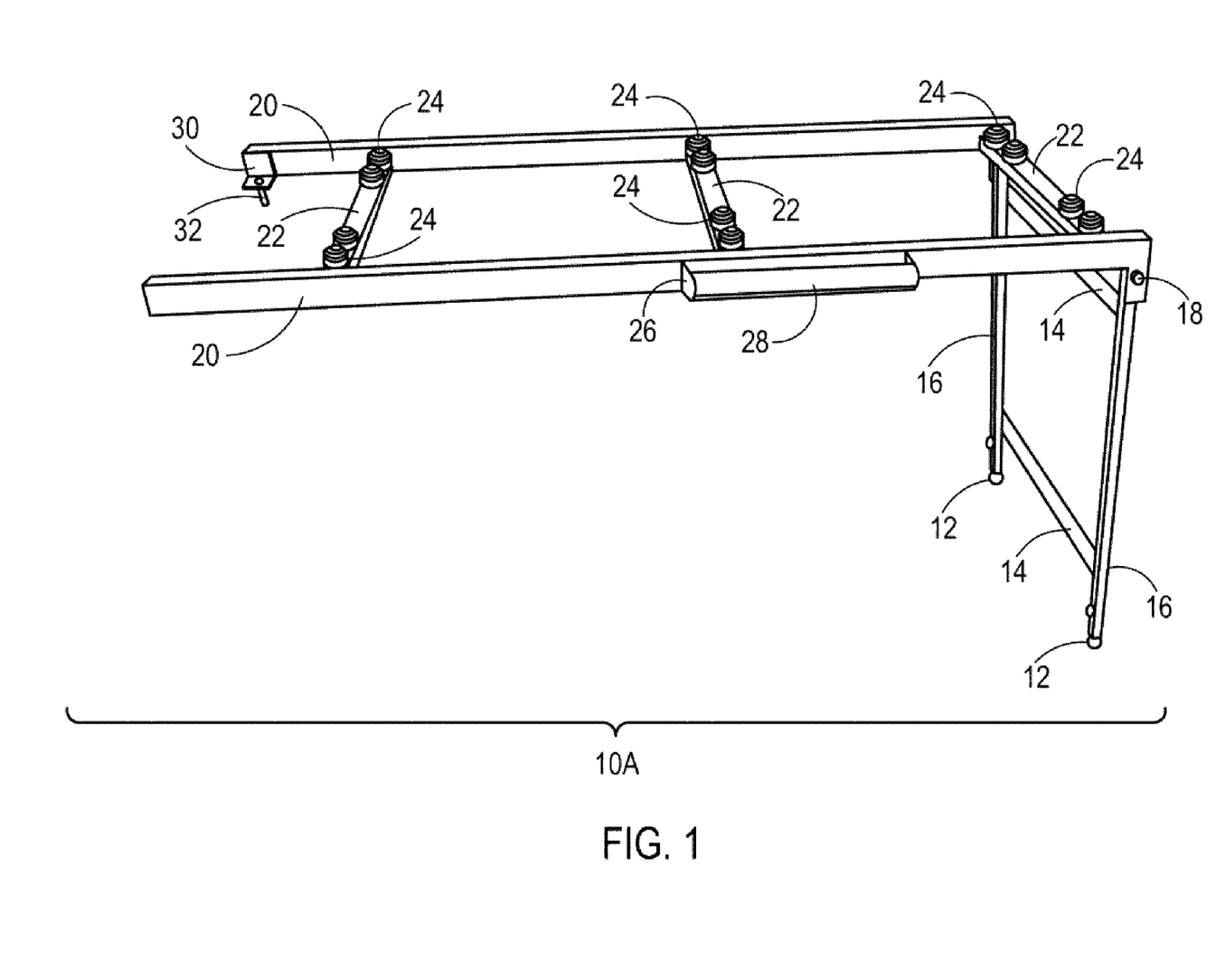
FIG. 1 is a perspective side view of an embodiment of an infeed/outfeed table attachment.

Referring now to FIG. 1, in one embodiment of the present invention, an infeed/outfeed table attachment 10A for processing an object through a processing device/worktable 200 (shown, for example, in FIGS. 2, 3 and 5-12) is provided with a support frame. The object may be a material such as plywood sheet goods, PVC sheet goods, lumber, solid surface goods, composite materials or any material that requires processing through a processing device. The processing device may be a machine such as a saw, a router table, a shaper or any other device for processing plywood sheet goods, PVC sheet goods, lumber, composite materials or any suitable material. The processing device may be mounted on or used in association with a worktable.

Figure 4:
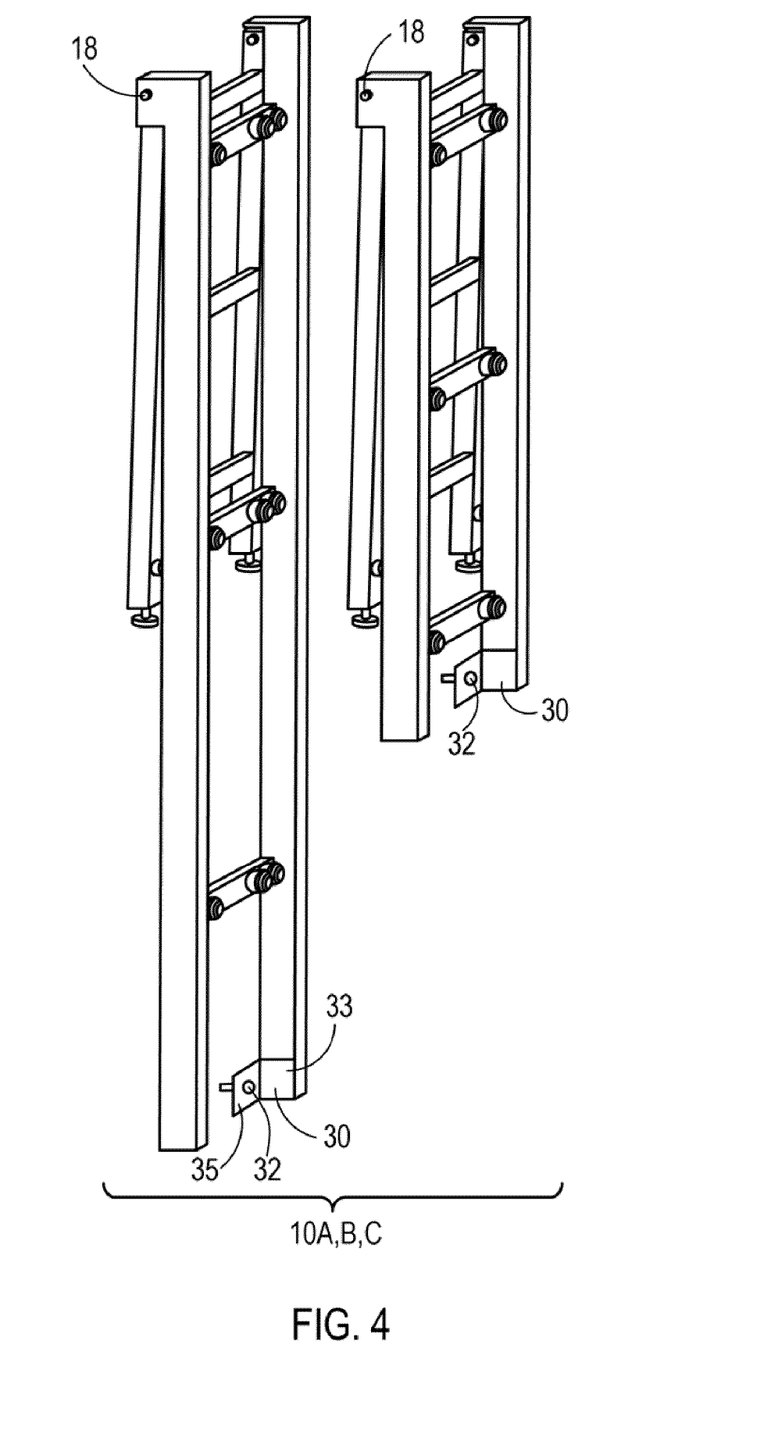
FIG. 4 is a perspective side view of infeed/outfeed table attachment in a folded position.

The support frame may comprise a generally vertical portion and a generally horizontal portion, joined together with a hinge device 18 that permits the table attachment 10A to be folded into a flat position, as shown, for example, in FIG. 4. The hinge device 18 may be provided with a lock nut that may be tightened so that the legs do not open and close quickly, thus reducing the chance of squeezing the fingers of the user of the device. The vertical portion may comprise vertically adjustable leveling feet 12, vertical support members 16, and horizontal support members 14 provided between the vertical support members 16. The horizontal portion may comprise side support members or main frame 20, central support members 22 provided between the side support members 20, and main frame mounting bracket 30. The side support members 20 angle, welded or bolted to the main frame, at a seven degree angle. This angle serves as the pivotal hinge mounting point, as well as a stop to prevent the legs from being overextended, with the leg attachments bolted to the angle brackets, including the locking nuts, providing the adjustability of the leg folding tension, on one end, and the end having the L-shaped end may comprise the hinge device 18 and connection to the vertical portion. The ends of side support members 20 may be capped with end caps (not shown). The end caps may be made of plastic, or any other suitable material.

The table attachment 10A is attached to the processing device by a number of parts. A main frame mounting bracket or brackets 30, at least two would be needed. Main frame mounting bracket or brackets 30 may be generally L-shaped brackets, when viewed in a cross-section through the side of the bracket that connect to a vertical inside surface of the side support members 20 with a horizontal upper surface of sliding mounting brackets 140. The main frame mounting brackets 30 and sliding mounting brackets 140 are removably connected to each other using a height adjustable locator pin or bolt 32 that may be threaded through the main frame mounting brackets 30 to adjustably fix the height adjustable locator pin or bolt 32 to main frame mounting bracket 30. Height adjustable locator pin 32 which act as a locator pin and may have a locking nut moving on the threads to provide height adjustment between the connection between the main frame mounting brackets 30 and sliding mounting brackets 140. The height adjustable locator pin 32 is fixed to the main frame mounting brackets 30. The sliding mounting brackets 140 will have a sliding mounting bracket hole 141 to accept height adjustable locator pin 32. Each main frame mounting bracket has a first flange 33 and a second flange 35.

One or more devices for generally horizontal movement of the material may be mounted to the table attachment 10A. For example, the device for horizontal movement of the material may comprise a plurality of ball rollers 24 mounted to the top side of each of the central support members 22. For example, four pair of ball rollers 24 may be attached to the top side of each of the central support members 22. It is noted that any suitable number of ball rollers 24 may be provided in any suitable position. The ball rollers 24 may be provided in the same plane to permit smooth handling of the material. Where the processing device provides a generally horizontal working surface, the plane for the table attachment 10A is also desirably generally horizontal. The ball rollers 24 are particularly suited for sheet goods such as plywood. The ball rollers 24 may be 1" diameter-balls, each supported by several dozen smaller ball bearings. In one embodiment, there are 80 smaller ball bearings, for each roller 24. The ball rollers 24 permit a worker to move a sheet material in any desired direction and with little effort.

Also, for example, the device for horizontal movement of the material may comprise a mounting bracket 26 attached to one or both sides of the side support members 20. The mounting bracket 26 may be adapted to support both ends of a cylindrical roller 28. The cylindrical roller 28 spins about an axis and permits lateral movement of the material with respect to the processing device. The cylindrical roller 28 is particularly suited for sheet goods such as plywood. By pivoting the material to be processed on the cylindrical roller 28, the cylindrical roller 28 may effectively reduce the total weight of the material to be processed by fifty percent, thus making it easier to load and unload the material. Once the sheet material is pivoted against the roller 28, a worker may push the material onto the device with less effort.

Using the present invention configured with the components described herein, a worker is able to easily load and unload materials onto and off of the processing device. After loading the material, the worker no longer needs to support the full weight of the material. Also, the rollers permit movement of the material with less effort. Rather than having a situation where the material is resting on the upper surface of the processing device itself, the material is at least partially supported by the table attachment.

Figure 2:
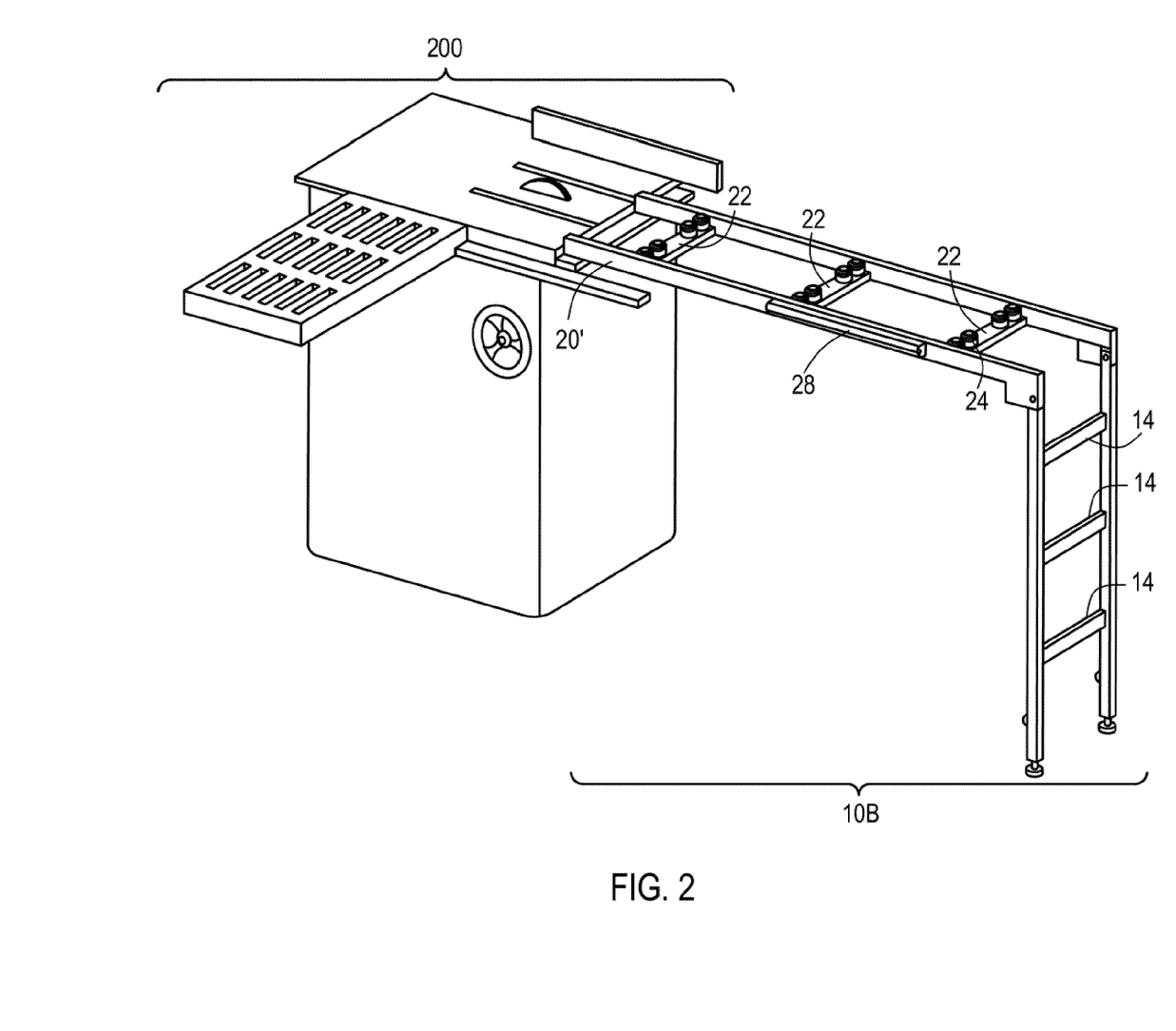
FIG. 2 is a perspective side view of another embodiment of an infeed/outfeed table attachment attached to a table saw.

FIG. 2 as in one embodiment of the present invention, shown is an infeed/outfeed table attachment 10B having three horizontal support members 14, three central support members 22, and a cylindrical roller 28. In this embodiment, each of the four central support members 22 shown in FIG. 2 has two pair of ball rollers 24. The mounting bracket for this installation is shown as a simple angle, which is useful on machines that require only a few mounting positions based on the limited number of placement points of the device, and there are no sliding parts. The adjustments are provided via a series of holes, spaced at various points, and coinciding with the distance between the locator pins/bolts 32. It is a manual method of inserting the device in the appropriate set of locator holes for the desired lateral placement, which is based on the width of the material to be processed. This same method of mounting can be used instead of the T-track and sliding brackets, when the application does not require infinite lateral adjustability.

Figure 3:
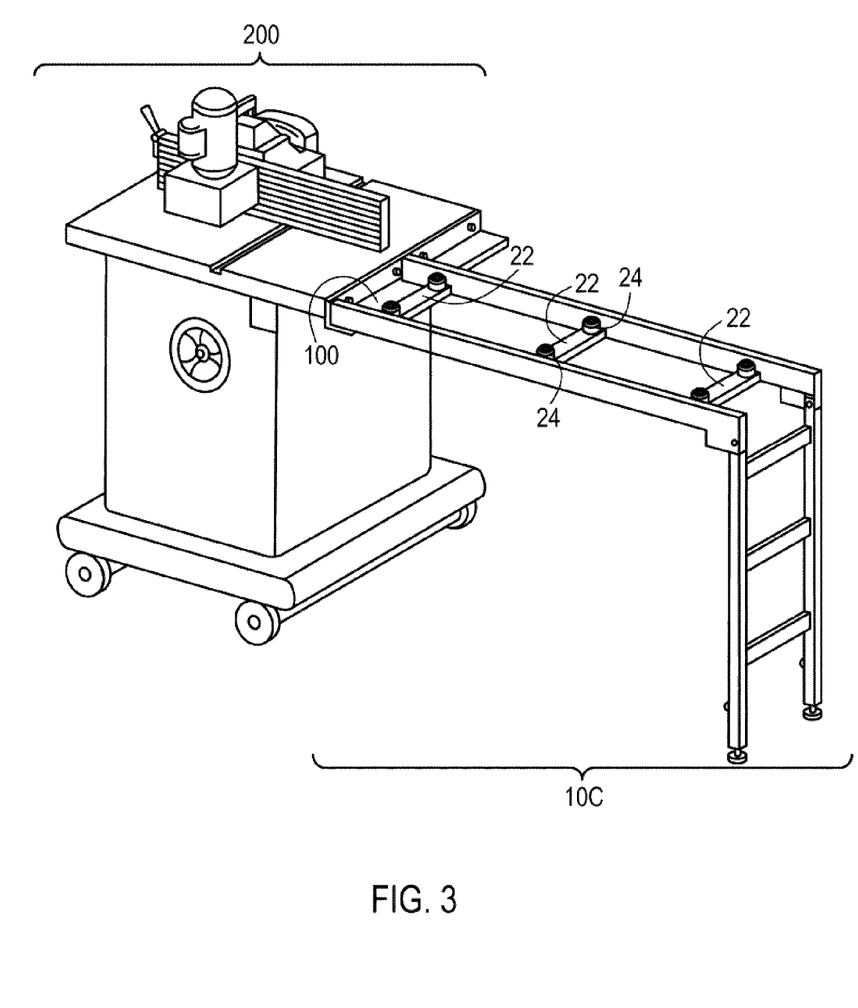
FIG. 3 is a perspective side view of yet another embodiment of an infeed/outfeed table attachment attached to a router table.

FIG. 3 as in one embodiment of the present invention, shown is an infeed/outfeed table attachment 10C has three central support members 22, and no cylindrical roller 28. In this embodiment, each of the three central support members 22 shown in FIG. 3 has a pair of ball rollers 24. The lineal support roller 28 is not required on this type of processing machine due to the fact materials are feed from the end of the processing device for the processing of the materials. Here again, a typical mounting brackets 100 can be used, but are not required, nor is the T-track assembly, due to the limited lateral position of the feed device. A simple angle, with a series of locator holes is a practical solution in these instances. Also shown is attachment of the table attachment 10C to a processing device/worktable 200 (equipped with a router, jig saw, or the like) via a horizontal movement device 100. Details of the attachment of the table attachment 10C to the horizontal movement device 100 of the processing device/worktable 200 are provided below.

FIG. 4 shows two exemplary table attachments 10A/10B/10C, each folded into a flat position, as shown, for example, in FIG. 4. The generally vertical portion and the generally horizontal portion of each table attachment 10A/10B/10C are foldable due to the hinge device 18. In the folded, flat position, the table attachment 10A/10B/10C may be hung from a suitable load-bearing vertical surface such as a storage cabinet or wall (not shown). This feature makes the table attachment 10A/10B/10C easy to store. Shown are main frame mounting brackets 30 and pin 32. Each main frame mounting bracket has a first flange 33 and a second flange 35.

Figure 5:
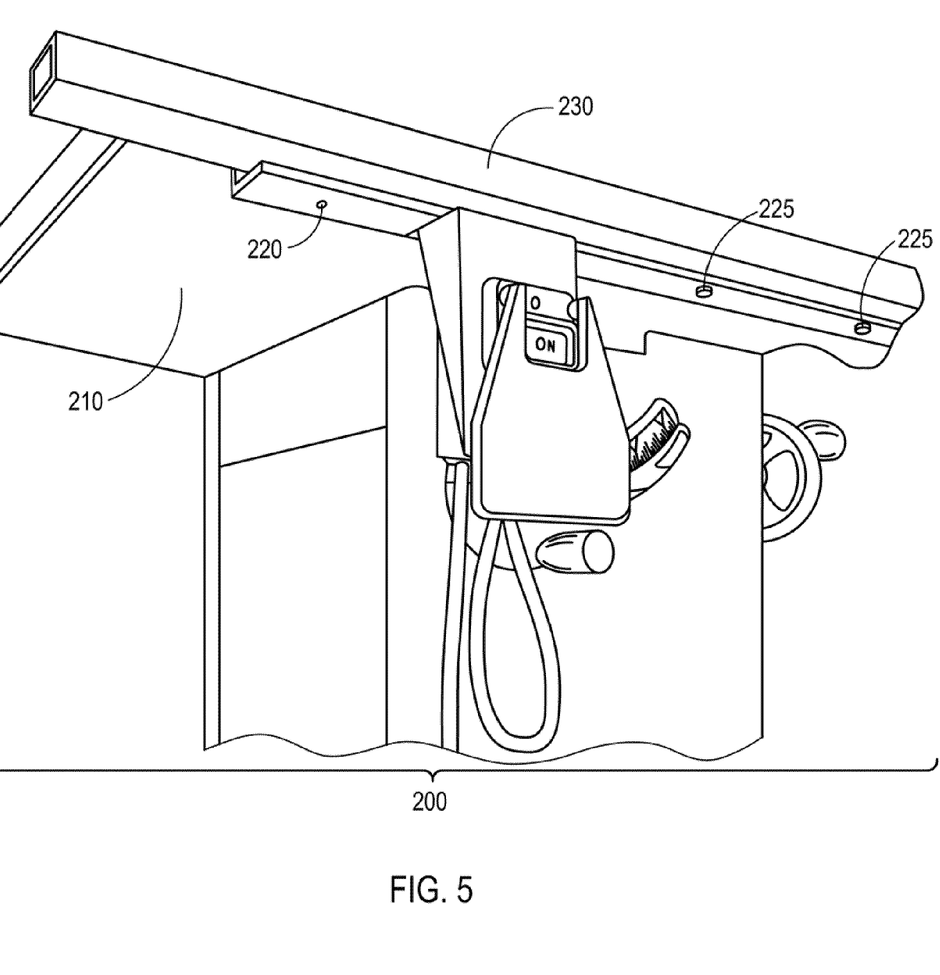
FIG. 5 is a perspective side view of a processing device/worktable, angle mounting bracket, and a rip fence guide box beam; as supplied with processing device.
Figure 6:
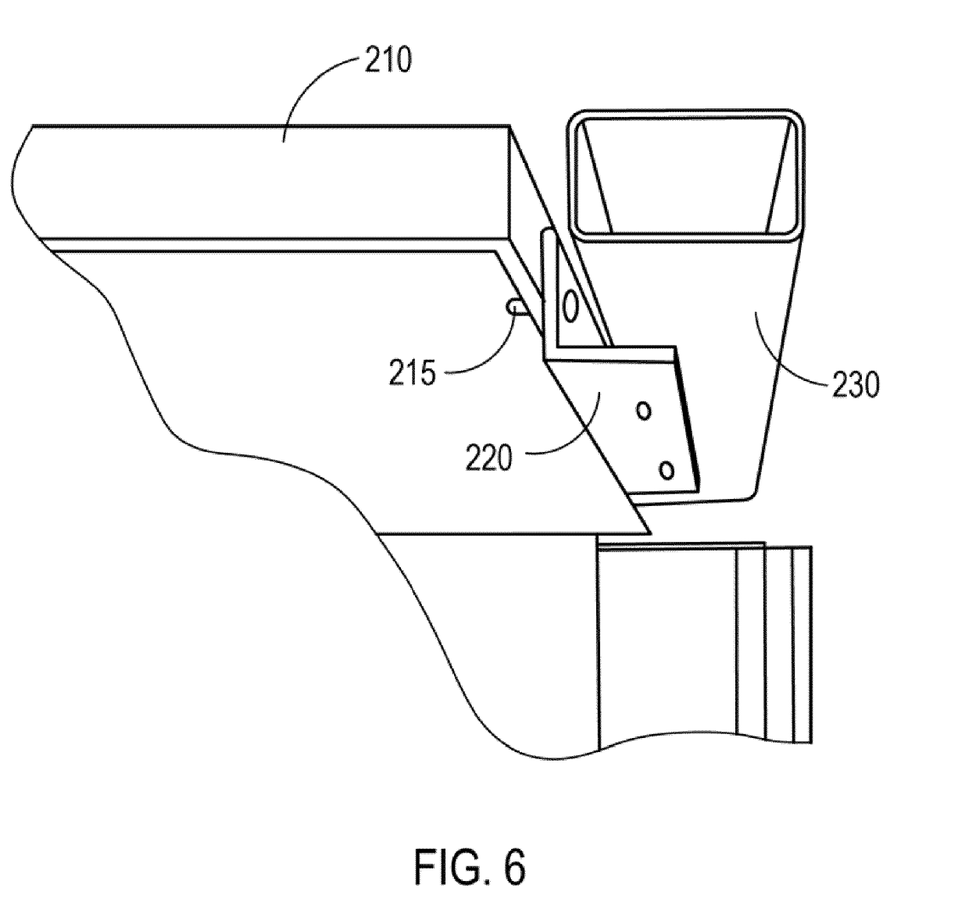
FIG. 6 is a perspective end view of the processing device/worktable, angle mounting bracket, and the rip fence guide box beam; as supplied with processing device.
Figure 7:
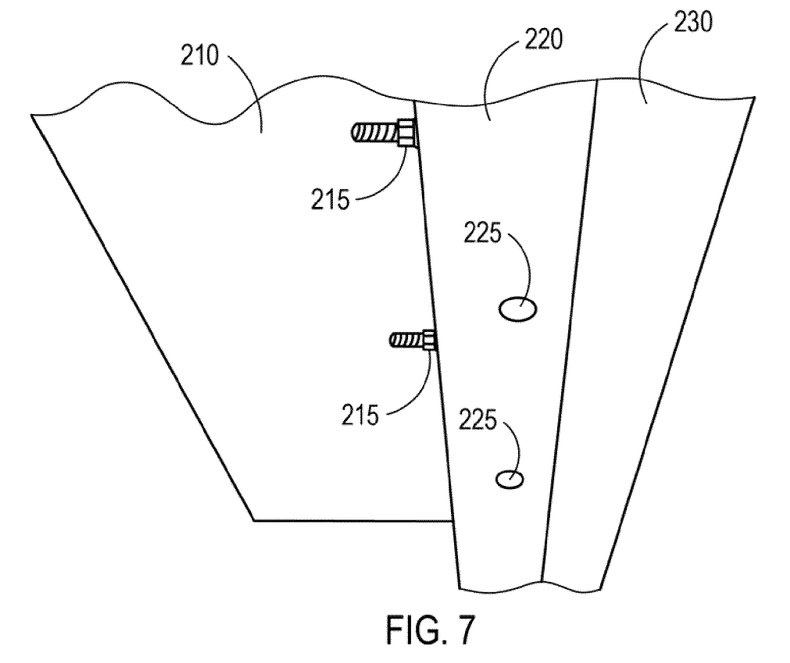
FIG. 7 is a perspective bottom view of the processing device/worktable, angle mounting bracket, and the rip fence guide box beam; as supplied with processing device.

FIGS. 5-7 show a standard connection between a processing device/worktable 200 and a rip fence guide these parts are commonly included with the saw, and not the present invention. The rip fence guide typically includes a support bracket 220 and a box beam 230. On the underside of the rip fence guide, fastening bolts 225 are provided for fastening the box beam 230 to the support bracket 220. The support bracket 220 is attached to a working surface 210 of the processing device/worktable 200 using fasteners 215. The support bracket 220 may be L-shaped, where the vertical portion of the bracket 220 is attached to the working surface 210 of the processing device/worktable 200 and where the horizontal portion is attached to the box beam 230. The box beam 230 may be made of steel or any other suitable material.

Figure 8:
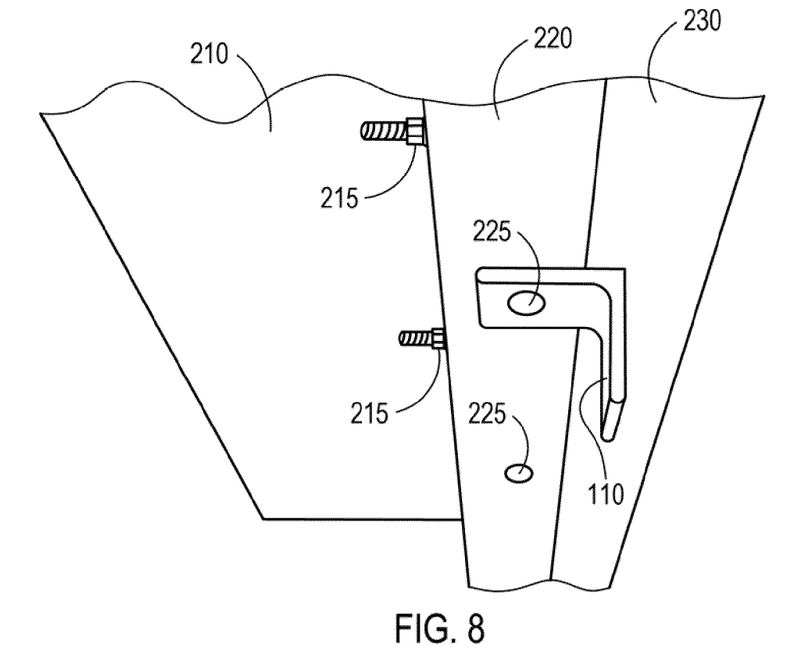
FIG. 8 is a perspective bottom view of the processing device/worktable, angle mounting bracket, the rip fence guide box beam, and a support bracket attached to the, angle mounting bracket, and a rip fence guide box beam.

As shown in FIG. 8, in order to attach the table attachment 10A/10B/10C of the present invention to a processing device/worktable 200, angle brackets 110 are attached to the bottom of support bracket 220 using a plurality of fastening bolts 225. Each angle bracket 110 is provided with a hole adapted to receive fastening bolts 225. One at a time, a user removes the existing fastening bolts, and the angle bracket 110 is attached to the bottom of the support bracket 220 with fastening bolts 225. The angle brackets 110 may be formed from aluminum or any other suitable material. The fastening bolts 225 may be longer than the existing fastening bolts. For example, ¼.times.20.times.1 inch bolts may be used for the fastening bolts 225, which generally provides a sufficient length for proper connection of each angle bracket 110 to the support bracket 220.

Figure 9:
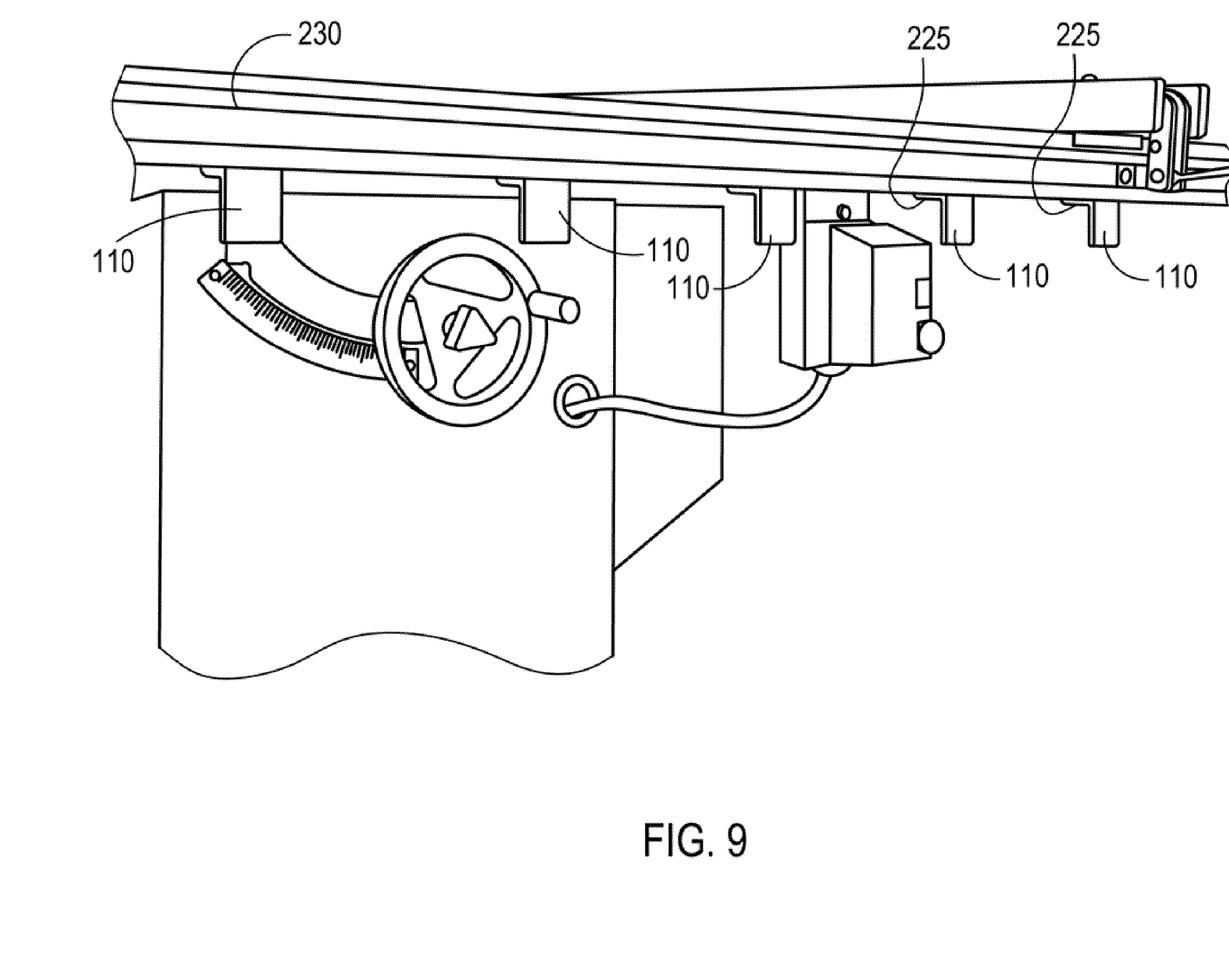
FIG. 9 is a perspective side view of five angle brackets attached to the rip fence guide box beam.

Any suitable number of angle brackets 110 may be attached to the support bracket 220. For example, as shown in FIG. 9, five angle brackets 110 are attached at generally equally spaced intervals.

Figure 10:
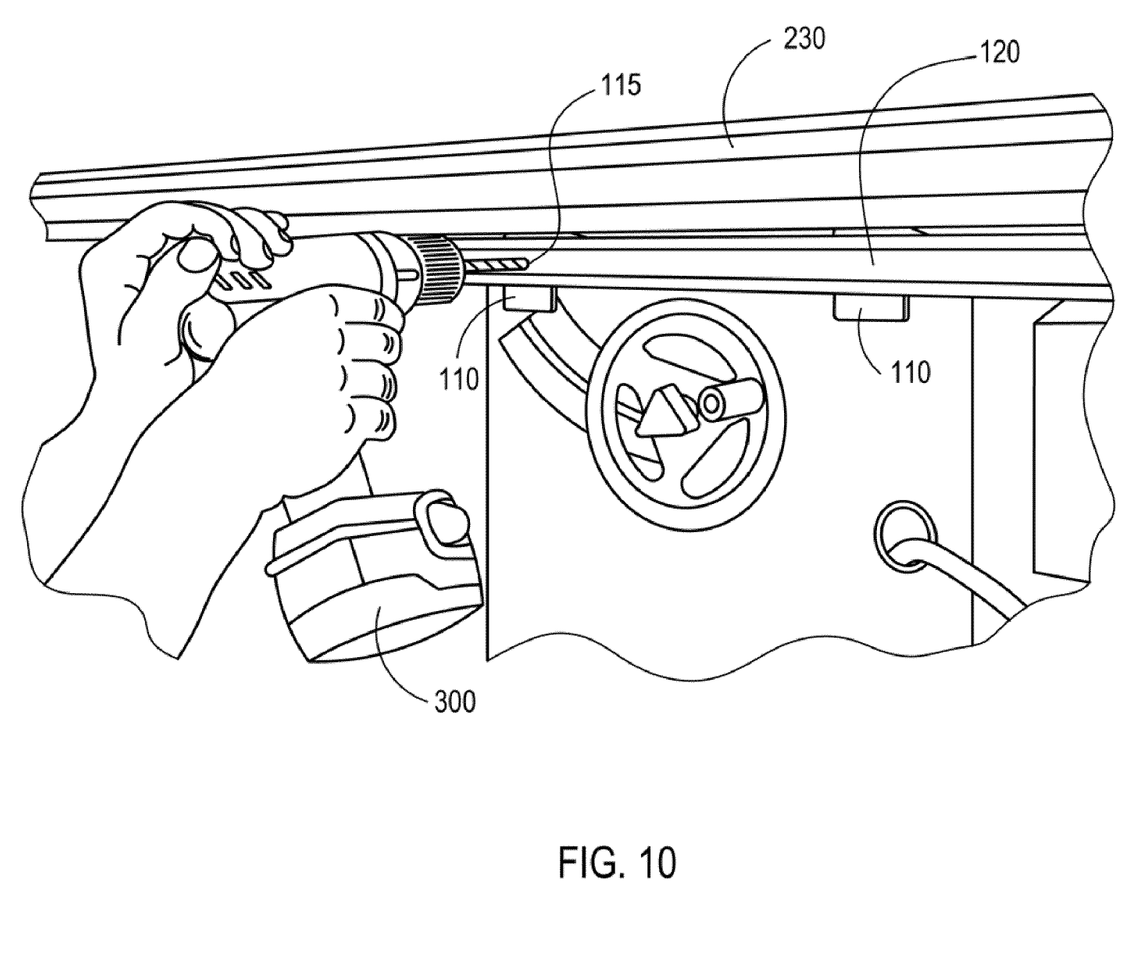
FIG. 10 is a perspective side view of a track being attached to the support brackets, where holes are drilled in the track and support brackets using a hand held drill.

Once the angle brackets 110 are attached to the support bracket 220, as shown, for example, in FIG. 10, a T-track 120 is attached to the angle brackets 110. Temporary clamps 400 (shown in FIG. 12) are used to temporarily secure the T-track 120 to the angle brackets 110. The angle brackets 110 are, in one embodiment, about 1/16" below the rip fence box beam 230. A piece of laminate or thin cardboard may be used as a shim. The end of the T-track 120 may be provided so as to be even with the end of the processing device/worktable 200. The T-track 120 may be attached to each of the angle brackets 110 with a pair of 10-24 screws 115 with locknuts and washers for each angle bracket 110. A hole may be drilled into T-track 120 using a handheld drill 300 and appropriately sized drill bit. The head of each screw 115 is countersunk into the inside of the T-track 120 so as not to interfere with the operation of the T-track 120 with respect to sliding mounting brackets 140, described in greater detail below.

Figure 11:
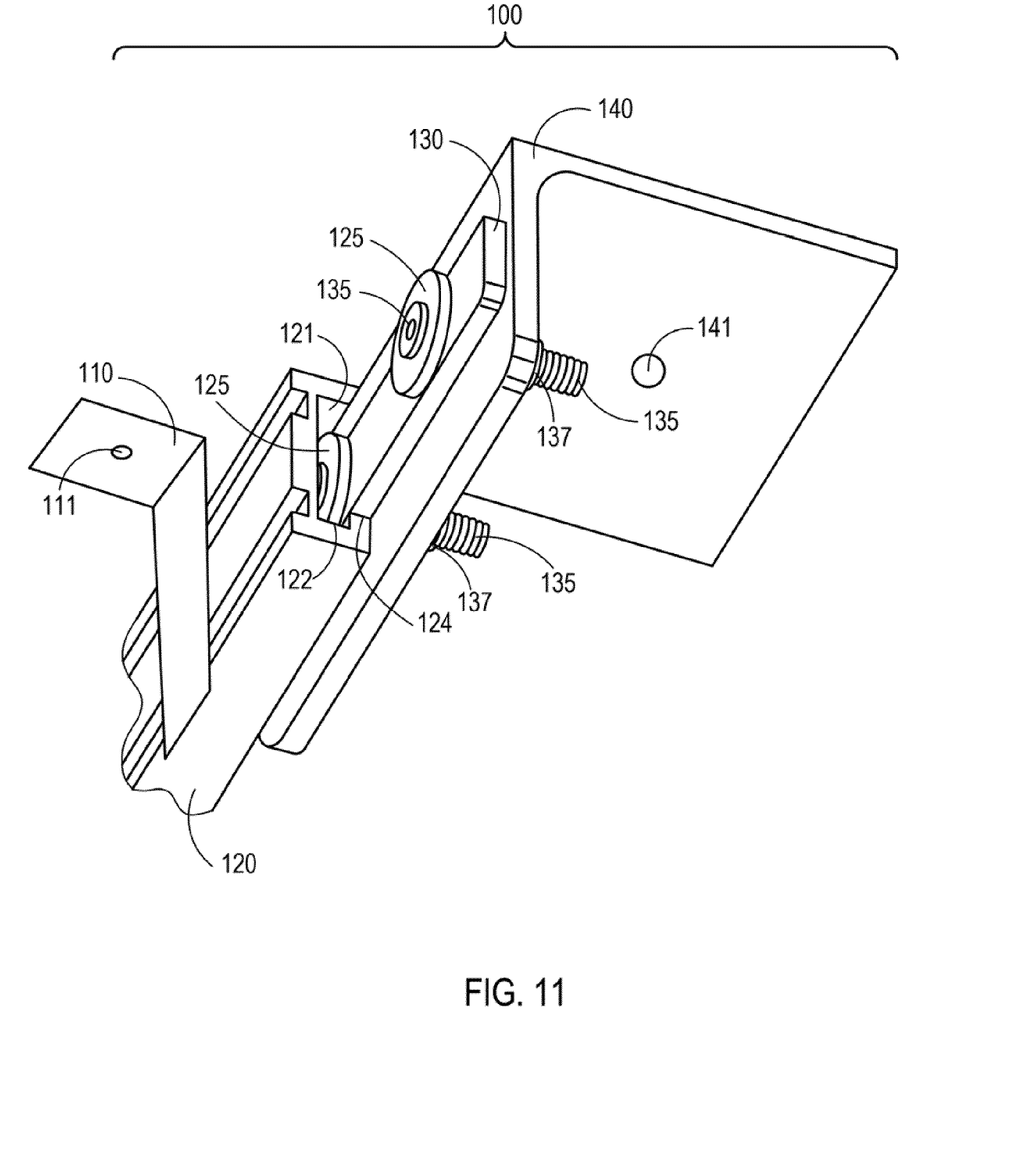
FIG. 11 is a perspective end view of a horizontal movement device; and precision sliding mounting brackets and T-track configuration.

Before attachment of the T-track 120 to the angle brackets 110, as shown in FIG. 11, a number of sliding members are placed into sliding engagement with the T-track 120. The T-track 120 has a top recess 121 and bottom recess 122 to secure captive roller 125, top recess 121 and bottom recess 122 are in sliding engagement with captive roller 125. The T-track 120 also has a lip 124 adapted to receive a flat section 130 in sliding engagement. The outer diameter of captive roller 125 is larger than the vertical height of the flat section 130. As such, the combination of the captive roller 125 and flat section 130 create a T-shape, which fits into sliding engagement with the T-shaped slot formed by top recess 121 and bottom recess 122 and the lip 124, respectively. A bolt 135 may be provided to attach the captive roller and the flat section 130 with the mounting bracket 140. A nut 137 may be provided to engage with a threaded portion 132 of bolt 135 thus completing the connection. The nuts 137 may be tightened or loosened so as to provide just enough resistance to secure the assembly while simultaneously allowing for sliding engagement between the sliding mounting brackets 140 and the T-track 120.

Figure 12:
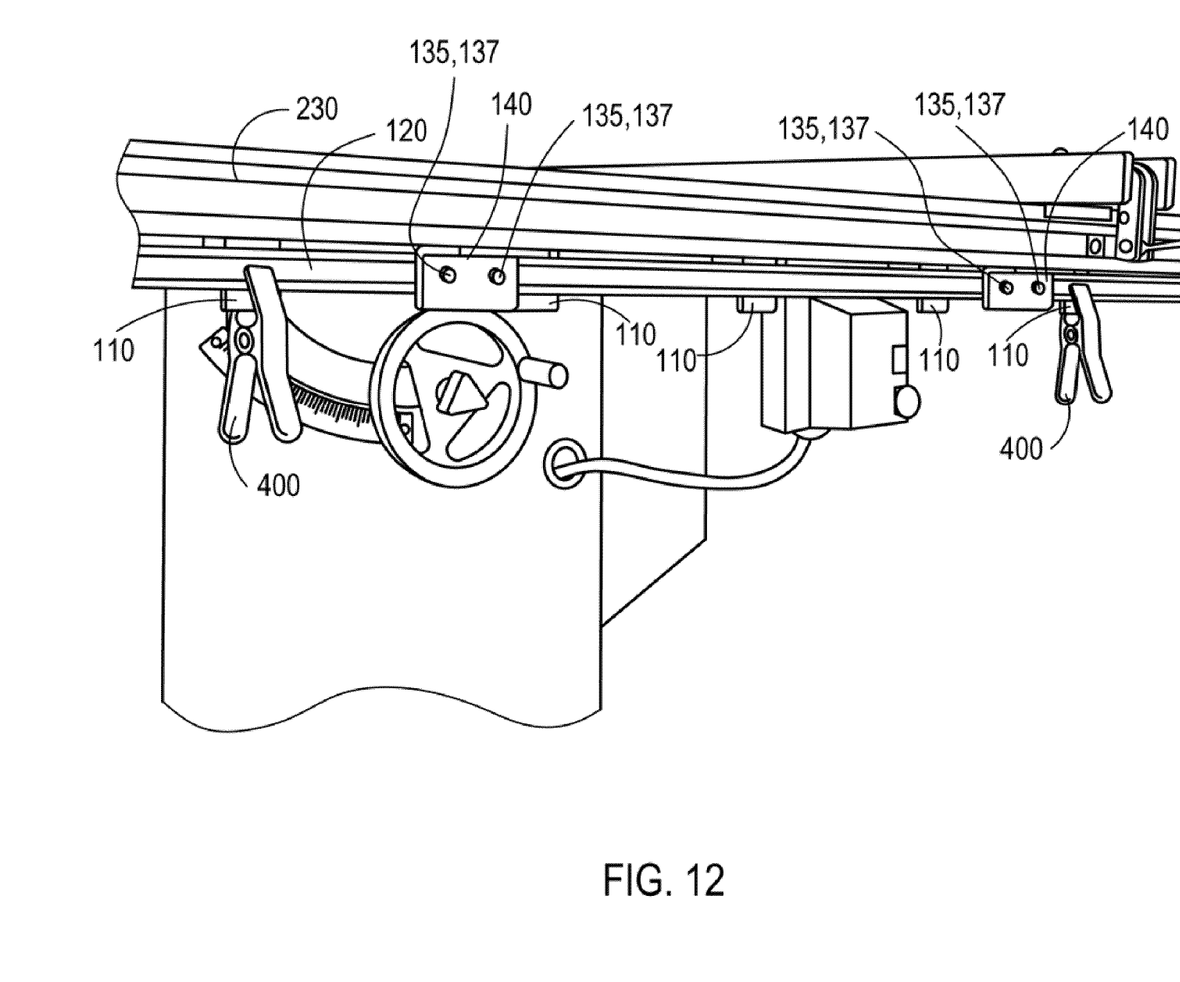
FIG. 12 is a perspective side view of the processing device/worktable, the rip fence guide, the angle brackets, and the horizontal movement device that serves as the precision sliding mounting brackets.

FIG. 12 shows the sliding mounting brackets 140 after they have been attached to the T-track 120. At this point, the sliding mounting brackets 140 are adapted for connection to the table attachment 10A/10B/10C.

The sliding mounting brackets 140 are be attached to the table attachment 10A/10B/10C via main frame mounting brackets 30 shown in FIG. 1, and 10A, B, C. For example, the table attachment 10A/10B/10C is placed against the processing device/worktable 200 such that the end caps or the very end of the main frame 20 are touching the rip fence box beam 230, and such that the main frame mounting brackets 30 are aligned with sliding mounting brackets 140. The center of each bolt in the nut and bolt connector 32 (shown in FIG. 1) is marked on each of the sliding mounting brackets 140. For example, a $^{21}/_{64}$" hole is bored into each mounting bracket 140. A $^{5}/_{16}$" bit may be used and then reamed up to $^{21}/_{64}$". Each hole should be countersunk such that the nut of the nut and bolt connector 32 settles into the hole and has little or no side to side movement. The nut and bolt connector 32 is tightened so as to secure the main frame mounting brackets 30 to the sliding mounting brackets 140. The nut and bolt connector 32 is also adapted to provide vertical height adjustment of the table attachment 10A/10B/10C with respect to the processing device/worktable 200. In one embodiment, the ball rollers 24 should be set at a height so as to be about $^{1}/_{32}$" to $^{1}/_{16}$" higher than the top of the surface of the working surface 210 of the processing device/worktable 200. The adjustable leveling feet 12 may be adjusted vertically so as to provide a horizontally level working surface for the table attachment 10A/10B/10C.

As such, the table attachment 10A/10B/10C is secured to the processing device/worktable 200 and is ready to use. Due to the horizontal movement device 100, the table attachment 10A/10B/10C is provided in horizontal sliding engagement with respect to the processing device/worktable 200. As a result, sheet goods may be cut quickly and accurately. Also, due to the increased working area of the overall combined device, and due to the rollers 24 and cylindrical roller 28, it is easier to guide, move and cut sheet goods. The present inventors have observed that the present table attachment 10A/10B/10C is useful in preventing back injuries and strain to the user of the processing device/worktable 200, particularly as compared to use of the processing device/worktable 200 without the table attachment 10A/10B/10C.

The present table attachment 10A/10B/10C can be mounted and dismounted to the processing device/worktable 200 in a matter of minutes or even seconds. The table attachment 10A/10B/10C is multi positional along the rip fence using a T-track 120 and sliding mounting brackets 140. Multiple T-tracks 120 may be provided on multiple processing devices/worktables 200. As such, one table attachment 10A/10B/10C can be used interchangeably with multiple processing devices/worktables 200.

The table attachment 10B shown in FIG. 2 is the original and most popular embodiment of the present invention and is designed to permit one operator to handle bulky materials. The table attachment 10C shown in FIG. 3 is designed to easily install on a shaper or router table, and is particularly suited for shaping edges of materials. The present invention may also be used with contractor's saws. The present invention enlarges the feed area and the footprint of the saw, thus making the saw more stable.

As shown in FIGS. 1-12 a main frame or side support members 20 is dependent on central support members 22, to hold together the main frame, as well as provide a mounting surface for ball rollers 24. Ball rollers are the means for the multi directional movement of the materials to be processed.

The front cross rail or central support members 22, closest to the processing machine is held back away from the processing machine to permit the machine's rip fence to be used in conjunction with the present invention, generally to rip narrow pieces.

Hinge 18 is the pivot used to connect and allow for the legs or vertical support members 16 to be positioned either in an open position, seven degrees from perpendicular to side support members 20 which prevent the legs from collapsing once the weight of the materials are applied, as well as preventing the legs 16 to be able to extend beyond this seven degree position. This also allows the legs 16, to be folded or closed to a position parallel to the main frame 20 which permits the unit to fold flat for storage. Horizontal support members 14 are the cross supports which connect legs 16 together.

Mounting bracket 26 is the steel bracket which is fastened to side support members 20, and holds cylindrical roller 28 in a fashion which permits the materials to be rolled onto the present invention. The use of this roller allows the user to lift one end of the sheet goods, thereby reducing the weight lifted by fifty percent. Once the sheet is on the roller 28 the user is able to roll the sheet onto the device, and lay it flat.

Vertically adjustable leveling feet 12 are the adjustable feet which allow the present invention to be adjusted in height, to allow the invention to work on varying machines, or floor conditions.

Angle brackets are fastened to the front end of the main frame 20 and permit the present invention to be mounted, and removed to the sliding mounting bracket 140, page via a hole drilled into the sliding bracket 140. This hole is drilled by the end user, based on the particular machine they are using. As shown in FIG. 1 main frame mounting bracket 30, locator pins 32 are located at the front end of the main frame 20. The main frame mounting bracket 30 has a locator and height adjustment pin 32 that may be a locking nut and bolt. Main frame mounting bracket 30 connect the main frame 20 to the sliding mounting bracket 140.

The sliding mounting bracket 140 consists of several components, which when assembled into a unit, act as a precision sliding bracket, which is mounted into a sliding track or T-track 120. Flat bar 130 is a precision fitted guide for sliding bracket 140 by fitting snugly into the large groove or track 122. A rolling device or washer 125 is captured within the track 122 and allows the sliding bracket 140, to slide within the "T" shaped track of T track 120. Pivot bolt 135 is for rolling device 125 on which to roll, and is fastened to and tension controlled by locking nut 137. T-track 120, can be varying in length, and permits the present invention to be placed as needed, in relation to the cutting device, for feeding the sheets into the processing machine. This T-track 120 allows the device to be moved parallel to the front of the processing machine, based on the balance point of the cutting point of the processing device. This prevents the operator from having to try to balance two cut pieces, after they pass the cutting point.

The sliding bracket 140 and the T-track 120 are designed to bind when the invention is attached, so it remains still when loading the sheets onto the present invention. This is accomplished via a binding condition, caused by the leverage created by the length of the present invention, however slide easily when the invention is not attached.

T-track 120 holds sliding bracket 140, which is used to mount the invention to the processing machine, parallel to the machines work surface, and perpendicular to the front and/or rear of the processing machine.

Affixing the present invention to the sliding bracket 140 is a matter of dropping the locator pins into the holes drilled into the sliding brackets 140. These locator pins also provide for height adjustment in relation to the machine surface. The T track 120 is attached to the processing machine by means of angle brackets 110 and usually in a quantity of five pieces, which are mounted to the processing machine by making use of the existing bolts, which hold the existing front rail of the machine.

Once these angle brackets 110 are installed onto the processing machine the T track 120 can be positioned and drilled, for the mounting bolts holding T track 120 to the angle brackets 110. The position of the angle brackets 110 is dependent on the processing machine, as different manufacturers use different spacing on their attachment points. These angle brackets 110 determine the height of the invention, in relation to the processing device. These holes must be drilled by the end user, based upon their machine.

In general, the invention is a material handling device, designed to permit a single user to quickly mount or dismount the invention from the processing machine, regardless of brand of said machine, safely lift the goods to be machined, create a condition that permits accurate machining of the materials, both in front of and behind the processing machine, thereby saving time, materials, and injuries, and the need for a second person to assist in the machining process.

All parts of this invention are co-dependent on each other, and removal of any one part will render the invention useless, or with a diminished capability, or flexibility in using on multiple processing machines, without the need for adjustment when moving from one machine to another.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

What is claimed is:

1. A table attachment device, comprising:
   a processing device with a processing device end and a work surface;
   a support frame connected to the processing device, the support frame includes a plurality of vertically adjustable feet, the plurality of vertically adjustable feet provide height adjustment to the table attachment device, a plurality of vertical support members and a plurality of horizontal support members, the plurality of horizontal support members are cross supports that connect the vertical support members together, the plurality of vertically adjustable feet attached to the plurality of vertical support members and a plurality of side support members, a plurality of central support members, the central support members connect between the plurality of side support members, the plurality of side support members include a mounting bracket to support a cylindrical roller, the cylindrical roller permits lateral movement of the one or more sheet good objects to assist loading the one or more sheet good objects onto the support frame and a plurality of main frame mounting brackets each attached to the plurality of side support members;
   a hinge device to hingedly attach the plurality of vertical support members and the plurality of side support members, the hinge device is released to fold the plurality of vertical support members and the side support members together to facilitate storage;
   a plurality of ball rollers mounted to a top side of each of the central support members to permit smooth handling of the one or more sheet good objects along the plurality of side support members, the one or more sheet good objects processed by the processing device;
   a plurality of sliding mounting brackets connected to the plurality of main frame mounting brackets with a height adjustment pin at the processing device end, the height adjustment pin providing height adjustment to the table attachment device;
   a plurality of angle brackets that are each attached to a support bracket of the processing device, the plurality of angle brackets each attached to the support bracket with a fastening bolt;
   a T track attached to each of the plurality of angle brackets with a plurality of screws, each of the plurality of screws have a locknut and a washer; and
   a plurality of captive rollers engaged with the T track, each of the plurality of captive rollers attached to the plurality of sliding mounting brackets with a bolt and a nut, the plurality of captive rollers engaged with the T track.

2. The table attachment device according to claim 1, wherein the processing device is a table saw.

3. The table attachment device according to claim 1, wherein the processing device is a router table.

4. The table attachment device according to claim 1, wherein the processing device is a work table.

5. The table attachment device according to claim 1, wherein the processing device is a tabled shaping device.

6. The table attachment device according to claim 1, wherein the object is at least one plywood sheet good.

7. The table attachment device according to claim 1, wherein the object is at least one PVC sheet good.

8. The table attachment device according to claim 1, wherein the object is at least one lumber good.

9. The table attachment device according to claim 1, wherein the object is at least one solid surface good.

10. The table attachment device according to claim 1, wherein the object is at least one composite material good.

* * * * *